(12) United States Patent
Yang et al.

(10) Patent No.: US 10,207,746 B2
(45) Date of Patent: Feb. 19, 2019

(54) VEHICLE FLOOR PAN

(71) Applicant: FORD GLOBAL TECHNOLOGIES, LLC, Dearborn, MI (US)

(72) Inventors: Herbert Yang, Saline, MI (US); Sean Timothy Ryan, Farmington Hills, MI (US); John Michael McGuckin, Ann Arbor, MI (US); Pratyaksh Kamath, Canton, MI (US); Praveenmanickam Renganathan, Detroit, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/434,473

(22) Filed: Feb. 16, 2017

(65) Prior Publication Data

US 2018/0229777 A1    Aug. 16, 2018

(51) Int. Cl.
| | |
|---|---|
| *B60N 2/01* | (2006.01) |
| *B62D 25/20* | (2006.01) |
| *B60N 2/015* | (2006.01) |
| *B62D 21/15* | (2006.01) |
| *B62D 27/02* | (2006.01) |

(52) U.S. Cl.
CPC ......... *B62D 25/2036* (2013.01); *B60N 2/015* (2013.01); *B62D 21/157* (2013.01); *B62D 27/02* (2013.01)

(58) Field of Classification Search
CPC .... B62D 25/2036; B62D 21/15; B60N 2/305; B60N 3/066; B60N 2/015; B60N 2/06; B60N 2/2809; B60N 2/2893; B60N 2/3011; B60N 2/3031

USPC .......... 296/187.08, 187.12, 193.07, 204; 280/124.109, 784, 777, 783, 785, 788; 180/68.5, 274, 312, 68.6

See application file for complete search history.

(56) References Cited

U.S. PATENT DOCUMENTS

| | | | | |
|---|---|---|---|---|
| 3,054,636 | A | * 9/1962 | Wessells | B62D 21/10 296/204 |
| 4,892,350 | A | * 1/1990 | Kijima | B62D 25/025 296/187.12 |
| 8,118,350 | B2 | 2/2012 | Mendoza et al. | |
| 8,585,134 | B2 | * 11/2013 | Yasui | B62D 21/152 296/204 |
| 8,979,173 | B2 | 3/2015 | Kojo et al. | |
| 2013/0257097 | A1 | * 10/2013 | Kojo | B62D 21/15 296/187.08 |

(Continued)

FOREIGN PATENT DOCUMENTS

DE    202016103854    10/2016

*Primary Examiner* — D Glenn Dayoan
*Assistant Examiner* — Sunsurraye Westbrook
(74) *Attorney, Agent, or Firm* — Jason Rogers; Brooks Kushman P.C.

(57) ABSTRACT

A floor pan assembly is disclosed that includes a side sill extending in a longitudinal direction that has a lower portion and a top surface. The floor pan may include a weld flange having a height $H_1$ that is welded to the lower portion along a full length of the floor pan and an extended weld flange having a height $H_2$ that is higher than $H_1$ and welded to the top surface of the side sill along a limited length of the floor pan. The floor pan may also include a corrugated area integrally provided in the floor pan that includes a plurality of furrows and ridges that extend obliquely relative to the longitudinal direction.

15 Claims, 4 Drawing Sheets

(56) References Cited

U.S. PATENT DOCUMENTS

2015/0251705 A1* 9/2015 Mildner ................ B62D 25/20
296/187.08

* cited by examiner

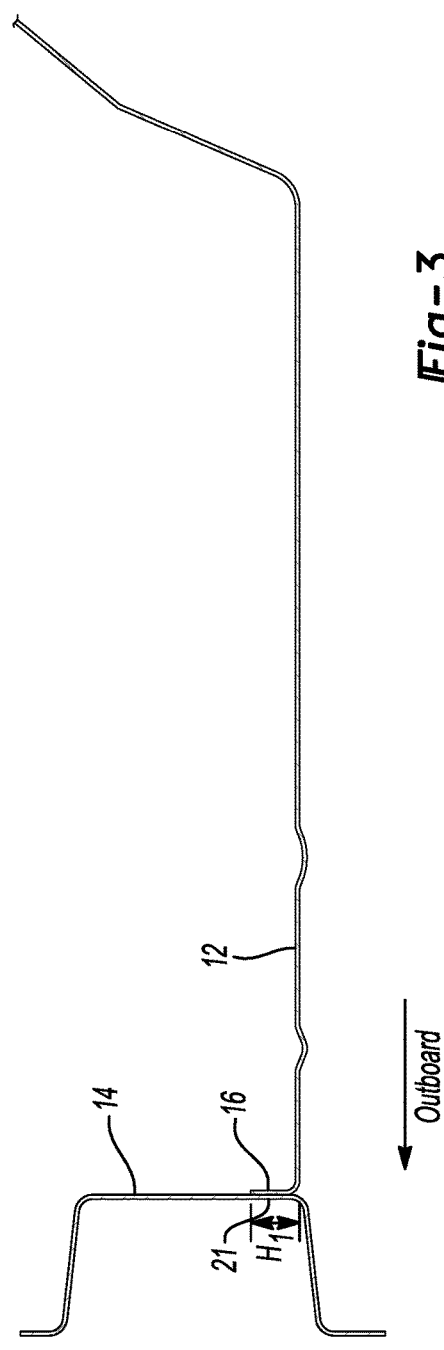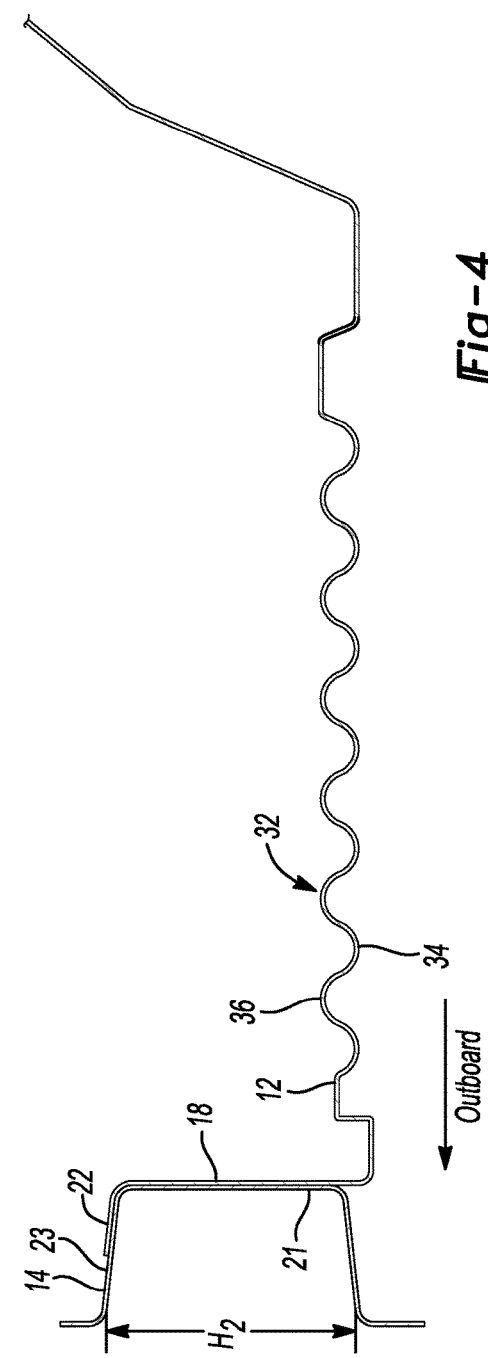

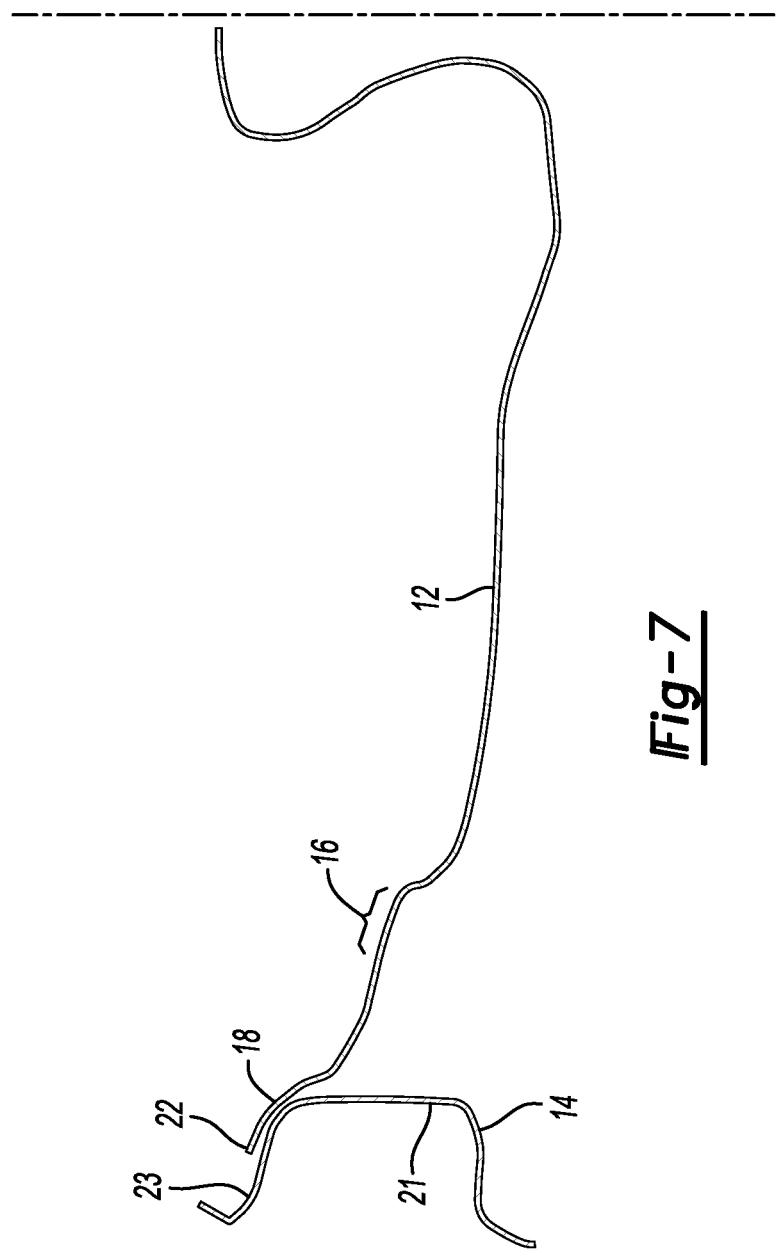

VEHICLE FLOOR PAN

TECHNICAL FIELD

This disclosure relates to a vehicle floor pan that is provided with additional material to allow increased stretching of the floor pan in an oblique side impact.

BACKGROUND

A floor pan of a vehicle may be welded to a side sill in the prior art, as illustrated in FIG. 1. In a side impact, such as a side impact with a pole, severe deformation of the vehicle underbody structure may occur. The severe deformation can result in the floor pan "F" separating from the side sill "S", tearing of the floor pan "F" or tearing from other structural members.

Resistance welds, or spot welds, are normally used to attach the floor pan to the side sill and kick-up cross members. In a side impact, spot welds are subjected to complex loading due to shear loading, relative displacement between the floor pan and side sill, in-plane rotation about the weld or tensile loading. Such loading may be due to separating forces applied between adjacent sheet metal parts in a direction normal to the metal sheets. These types of complex loads may result in spot weld failure.

In addition, material failure during a side impact may be caused by severe deformation of underbody structural members and of the floor pan. Deformation of the floor pan may exceed the material elongation limits in some side impacts.

This disclosure is directed to solving the above problems and other problems as summarized below.

SUMMARY

According to one aspect of this disclosure, a floor pan assembly is disclosed that comprises a side sill and a floor pan. The side sill has a lower portion and a top surface. The floor pan includes a weld flange having a height $H_1$ that is welded to the lower portion along a full length of the floor pan and an extended weld flange having a height $H_2$ that is higher than $H_1$ and welded to the top surface of the side sill along a limited length of the floor pan.

According to another aspect of this disclosure, the extended weld flange may be welded at a lower end to the lower portion of the side sill and may be welded at a top surface to side sill. The extended weld flange may be provided at a rear portion of the floor pan (i.e. between the front seat rear cross member and the kick up cross bar at the rear edge of the front floor pan) and extends upwardly from the rear portion of the front floor pan.

According to another aspect of this disclosure, a floor pan assembly is disclosed that includes a side sill and a front floor pan. The side sill extends in a longitudinal direction on one side of the front floor pan and partially to the rear floor pan. The rear floor pan extends rearward from the kick-up cross member to the rear end or trunk area of the vehicle. The front floor pan has a side weld flange that is welded to the side sill and a corrugated area is integrally provided in the rear seat foot well area of the floor pan that includes a plurality of furrows and ridges extending obliquely relative to the longitudinal direction.

The furrows and ridges may extend at an angle of between 30 and 60 degrees rearward from the side sill. The corrugated area is a generally rectilinear area.

The floor pan assembly may further comprise a rear cross member attached to the floor pan below the front seat rear cross member and the kick-up cross member attached to the rear edge of the floor pan. The corrugated area may be provided between the front seat rear cross member and the kick-up cross member.

The side sill may be a right side sill, the side weld flange may be a right side flange and the corrugated area may be a right side corrugated area. The floor pan assembly may further comprise a left side sill and the floor pan may have a left weld flange welded to the left side sill and a left side corrugated area. The left side corrugated area may include a second plurality of furrows and ridges that extend obliquely relative to the longitudinal direction in the opposite direction relative to the furrows and ridges of the right side corrugated area.

According to another aspect of this disclosure the above aspects may be combined to provide a floor pan assembly comprising a side sill extending in a longitudinal direction that has a lower portion and a top surface. The floor pan may include a weld flange having a height $H_1$ that is welded to the lower portion along a full length of the floor pan and an extended weld flange having a height $H_2$ that is higher than $H_1$ and welded to the top surface of the side sill along a limited length of the floor pan. The floor pan may also include a corrugated area integrally provided in the rear seat foot well of the floor pan that includes a plurality of furrows and ridges that extend obliquely relative to the longitudinal direction.

The above aspects of this disclosure and other aspects will be described below with reference to the attached drawings.

BRIEF DESCRIPTION OF THE DRAWINGS

FIG. 3 is a cross sectional view taken along the line 3-3 in FIG. 2.

FIG. 4 is a cross sectional view taken along the line 4-4 in FIG. 2.

FIG. 7 is a cross-sectional view taken along the line 7-7 in FIG. 6.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
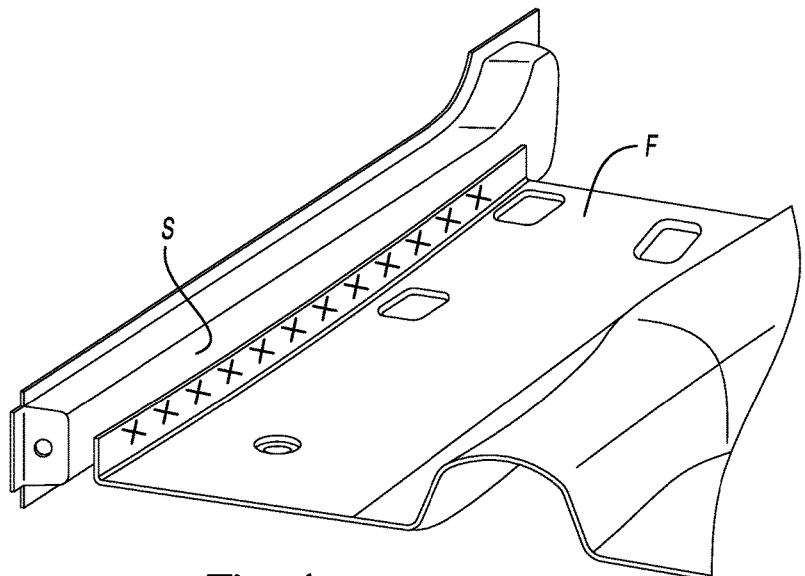
FIG. 1 is a fragmentary perspective view of a portion of a prior art floor pan and side sill.
Figure 2:
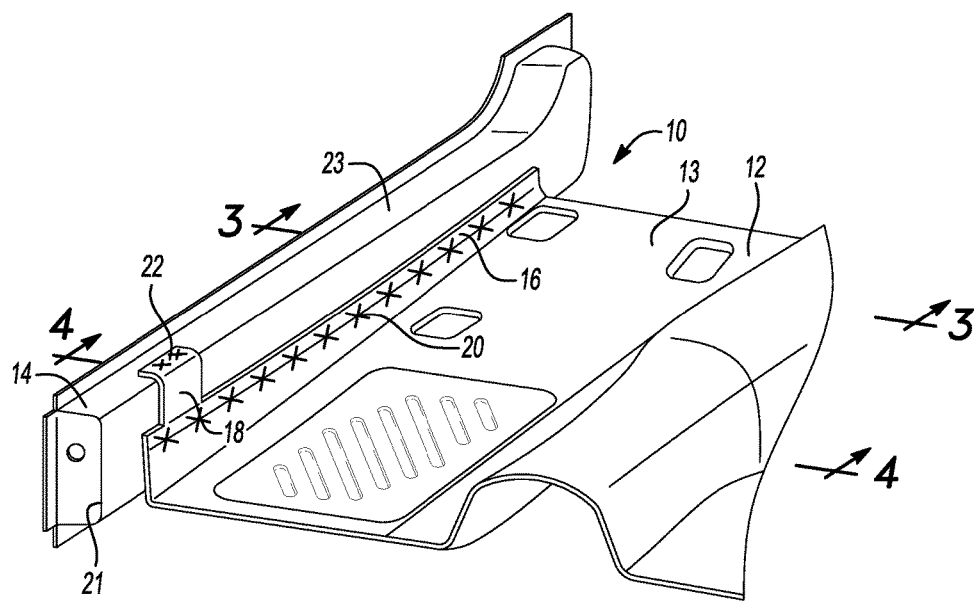
FIG. 2 is a fragmentary perspective view of a portion of a floor pan having an extended weld flange made according to one embodiment of this disclosure and a side sill.

Referring to FIG. 2, one embodiment of a front floor pan assembly 10 is partially illustrated that includes a portion of a front floor pan 12 and a side sill 14. The front floor pan 12 may also be referred to herein as the floor pan and it should be understood that a rear floor pan (not shown) is provided rearward of the kick-up cross member that extends from the front portion 13 of the floor pan 12 toward the rear end of the vehicle below the trunk. The side sill 14 may also be referred to as a rocker assembly. The floor pan 12 is attached to the side sill 14 by a weld flange 16 that is integrally formed as part of the floor pan 12. An extended weld flange 18 is provided in a rear portion of the floor pan 12 just in front of the kick-up cross member. A plurality of lower welds 20 are used to attach the weld flange 16 to the side sill 14 at a lower portion 21 of the side sill 14. An upper flange 22 is provided for welding the extended weld flange 18 to the side sill 14 on a top surface 23 of the side sill 14. The top surface 23 extends in a generally horizontal orientation in the transverse vehicle direction.

Referring to FIG. 3, a cross sectional view is provided of the side sill 14 and floor pan 12 taken through the line 3-3 in FIG. 2. The weld flange 16 is shown extending upwardly to a limited extent from a lower edge of the side sill 14, the extent of the height of the flange is referred to as $H_1$ in FIG. 3.

Referring to FIG. 4, a cross sectional view taken along the line 4-4 in FIG. 2 illustrates the floor pan 12 and side sill 14 that extends through the extended flange 18. The extended flange 18 is shown to extend from the floor pan 12 and a lower portion 21 of the side sill 14 upwardly along a vertical wall of the side sill and partially over a top wall 23 of the side sill 14. The extended weld flange 18 of the floor pan 12 extends from the lower portion 21 of the side sill 14 upwardly to the top surface 23 of the side sill 14, the extent of the height of the extended flange 18 is referred to as $H_2$ in FIG. 4.

Figure 5:
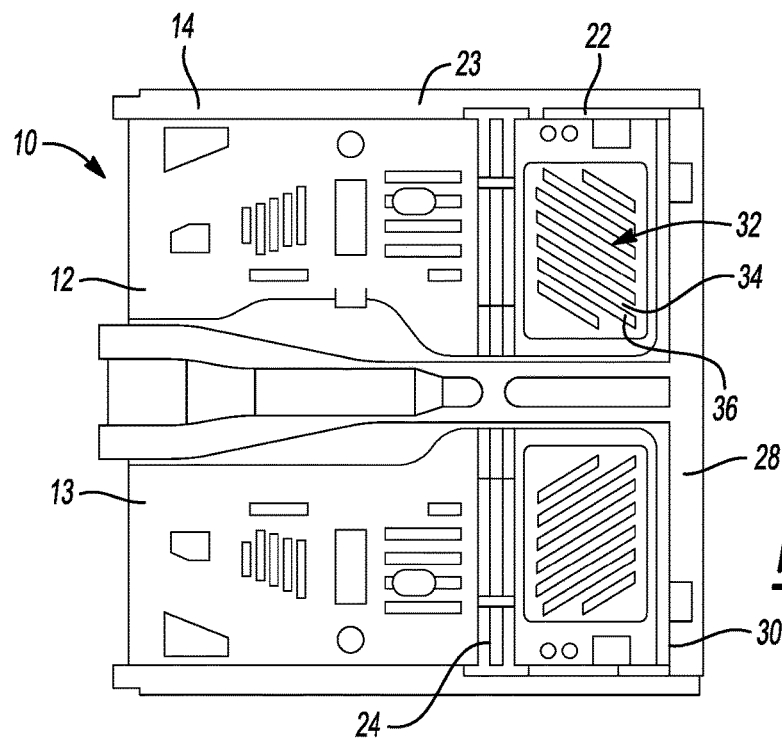
FIG. 5 is a top plan view of a floor pan having a pair of corrugated portions in a pair of rear seat foot well areas made according to another aspect of this disclosure.

Referring to FIG. 5, a floor pan assembly 10 is shown in a normal condition. The floor pan 12 is attached to a pair of side sills 14 as previously described with reference to FIGS. 2-4. The floor pan assembly 12 includes a front seat rear cross member 24 that extends from the side sill 14 to an intermediate area of the floor pan 12 and underneath the front seat. The front seat rear cross member 24 is below or adjacent the front seat rear support area. A kick-up cross member 28 is shown attached to a rear edge 30 of the front floor pan 12.

A corrugated area 32 is provided in the rear seat foot well between the front seat rear cross member 24 and kick-up cross member 28 on both sides of the floor pan 12 inboard of the side sills 14. The corrugated areas 32 include a plurality of furrows 34 and ridges 36 that are integrally formed as part of the floor pan 12. The furrows 34 and ridges 36 are also shown in the cross-section of FIG. 4.

The corrugated areas 32 provide additional metal in the floor pan 12 that may be stretched in a collision, such as an oblique side impact. The additional metal allows the floor pan to stretch and reduces the tendency of the floor pan to separate or tear in an oblique side impact. The diagonally or obliquely oriented furrows and ridges of the corrugated area increase the floor pan material available for stretching in the rear area of the floor pan 12. The additional metal effectively compensates for structural deformation and minimizes floor pan separation and tearing.

Figure 6:
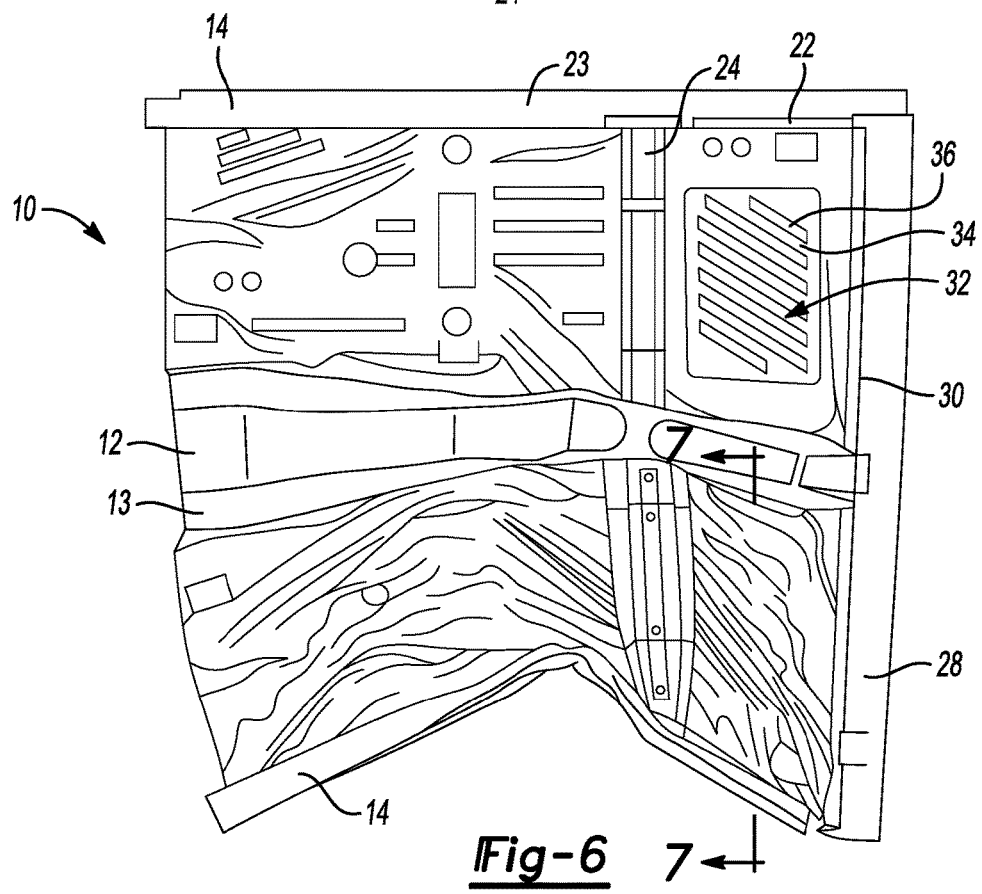
FIG. 6 is a top plan view of a floor pan having a pair of corrugated portions in a pair of rear seat foot well areas made according to another aspect of this disclosure showing the expected deformation after a simulated oblique side impact on one side.

Referring to FIG. 6, the floor pan assembly 10 is shown after an oblique side impact in front of the front seat rear cross member 24. The deformation, as illustrated, is a simulated deformation that was essentially confirmed by actual testing. As a result of the impact, the side sill 14 is severely deformed and the floor pan 12 is also deformed but does not tear and is not separated from the side sill 14. Diagonally oriented furrows 34 and ridges 36 of the corrugated area 32 allow the floor pan to stretch at the rear seat support area.

Referring to FIG. 7, one example of a post-impact simulation of the floor pan 12 is shown with the welds between the weld flange 16 and the lower portion 21 of the side sill 14 being separated. The top surface 22 of the extended weld flange 18 remains attached to the top surface 23. In this way, added material is provided for deformation of the floor pan 12 and separation of the floor pan 12 from the side sill 14 is avoided. In addition, the risk of tearing the floor pan 12 is also minimized.

It should be understood that providing a corrugated area in other areas of a vehicle or in other areas of the floor pan may be used to prevent tearing of a panel or floor separation during an impact event.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A floor pan assembly comprising:
a side sill having a vertically extending lower portion and a contiguous, horizontally extending top wall; and
a floor pan including a weld flange having a height $H_1$ welded to said lower portion along a full length of the floor pan and an extended weld flange having a height $H_2$ higher than $H_1$ and welded to said top wall along a limited length of the floor pan.

2. The floor pan assembly of claim 1 wherein the extended weld flange is welded at a lower end to the lower portion of the side sill and is welded at an upper end to the top wall of the side sill.

3. The floor pan assembly of claim 1 wherein the extended weld flange is provided at a rear portion of the floor pan and extends upward from the rear portion of the floor pan.

4. A floor pan assembly comprising:
a side sill extending in a longitudinal direction; and
a floor pan having a side weld flange welded to a side wall of the side sill, corrugations integrally formed in the floor pan that include a plurality of furrows and ridges extending obliquely relative to the longitudinal direction.

5. The floor pan assembly of claim 4 wherein the furrows and ridges extend at an angle of between 30 and 60 degrees rearward from the side sill.

6. The floor pan assembly of claim 4 wherein the corrugated area is rectilinear in shape.

7. The floor pan assembly of claim 4 further comprising:
a front seat rear cross member attached to the floor pan; and
a kick-up cross member attached to a rear edge of the floor pan, wherein the corrugated area is provided between the front seat rear cross member and the kick-up cross member.

8. The floor pan assembly of claim 4 wherein the side sill is a right side sill, the side weld flange is a right side flange and the corrugated area is a right side corrugated area, further comprising:
a left side sill; and
wherein the floor pan has a left weld flange welded to the left side sill, and a left side corrugated area that includes a second plurality of furrows and ridges that extend obliquely relative to the longitudinal direction in the opposite direction relative to the furrows and ridges of the right side corrugated area.

9. A floor pan assembly comprising:
a side sill extending in a longitudinal direction and having a vertically extending lower portion and a contiguous, horizontally extending top wall; and
a floor pan including a weld flange having a height $H_1$ welded to said lower portion along a full length of the floor pan and an extended weld flange having a height $H_2$ higher than $H_1$ and welded to said top wall of the side sill along a limited length of the floor pan and, a corrugated area integrally provided in the floor pan including a plurality of furrows and ridges that extend obliquely relative to the longitudinal direction.

10. The floor pan assembly of claim 9 wherein the extended weld flange is welded at a lower end to the lower portion of the side sill and is welded at an upper end to the top wall of the side sill.

11. The floor pan assembly of claim 9 wherein the extended weld flange is provided at a rear portion of the floor pan and extends upward from the rear portion of the floor pan.

12. The floor pan assembly of claim 9 wherein the furrows and ridges extend at an angle of between 30 and 60 degrees rearward from the side sill.

13. The floor pan assembly of claim 9 wherein the corrugated area is a rectilinear area.

14. The floor pan assembly of claim 9 further comprising:
a front seat rear cross member attached to the floor pan; and
a kick-up cross member attached to a rear edge of the floor pan, wherein the corrugated area is provided between the front seat rear cross member and the kick-up cross member.

15. The floor pan assembly of claim 9 wherein the side sill is a right side sill, the side weld flange is a right side weld flange and the corrugated area is a right side corrugated area, further comprising:
a left side sill; and
wherein the floor pan has a left weld flange welded to the left side sill, and a left side corrugated area that includes a second plurality of furrows and ridges that extend obliquely relative to the longitudinal direction in the opposite direction relative to the furrows and ridges of the right side corrugated area.

* * * * *